US007378167B2

(12) United States Patent
Mizuno

(10) Patent No.: US 7,378,167 B2
(45) Date of Patent: May 27, 2008

(54) SEPARATOR PASSAGE STRUCTURE OF FUEL CELL

(75) Inventor: Seiji Mizuno, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 747 days.

(21) Appl. No.: 10/773,210

(22) Filed: Feb. 9, 2004

(65) Prior Publication Data

US 2004/0157100 A1 Aug. 12, 2004

(30) Foreign Application Priority Data

Feb. 10, 2003 (JP) ............... 2003-032619

(51) Int. Cl.
H01M 8/04 (2006.01)
H01M 8/12 (2006.01)
H01M 2/00 (2006.01)
H01M 2/02 (2006.01)
H01M 2/14 (2006.01)

(52) U.S. Cl. .................. 429/26; 429/34; 429/38; 429/39

(58) Field of Classification Search ............ None
See application file for complete search history.

(56) References Cited

U.S. PATENT DOCUMENTS

| 4,769,297 | A | | 9/1988 | Reiser et al. |
| 5,108,849 | A | * | 4/1992 | Watkins et al. ............... 429/30 |
| 5,686,199 | A | * | 11/1997 | Cavalca et al. ............... 429/30 |
| 6,066,408 | A | | 5/2000 | Vitale et al. |
| 6,261,710 | B1 | | 7/2001 | Marianowski |

(Continued)

FOREIGN PATENT DOCUMENTS

DE 102 48 531 A1 4/2004

(Continued)

OTHER PUBLICATIONS

German Office Action, dated Jul. 21, 2005.

(Continued)

*Primary Examiner*—Patrick Ryan
*Assistant Examiner*—Julian Mercado
(74) *Attorney, Agent, or Firm*—Kenyon & Kenyon LLP

(57) ABSTRACT

An aspect of the invention for achieving the aforementioned objects relates to a fuel cell including at least one unit cell. The unit cell includes a first separator which is disposed on one side of an MEA, and which includes a first concave groove which constitutes a first gas passage, and a first convex rib whose rear surface constitutes a first refrigerant passage, and on which a first gas cross groove is formed; and a second separator which is disposed on the other side of the MEA, and which includes a second concave groove which constitutes a second gas passage, and a second convex rib whose rear surface constitutes a second refrigerant passage, and on which a second gas cross groove is formed. An integral refrigerant passage whose cross sectional area in a direction in which the integral refrigerant passage extends is equal to or larger than that of the first refrigerant passage and that of the second refrigerant passage is formed by combining the first refrigerant passage and the second refrigerant passage in a cell stacked direction when a plurality of the first separators and a plurality of the second separators are stacked.

16 Claims, 10 Drawing Sheets

U.S. PATENT DOCUMENTS

| | | |
|---|---|---|
| 6,372,373 B1 | 4/2002 | Gyoten et al. |
| 7,195,837 B2 * | 3/2007 | Suzuki et al. ............... 429/34 |
| 2002/0081477 A1 | 6/2002 | McLean et al. |
| 2002/0122970 A1 | 9/2002 | Inoue et al. |
| 2002/0168562 A1 * | 11/2002 | Funatsu et al. ............. 429/38 |

FOREIGN PATENT DOCUMENTS

| | | |
|---|---|---|
| JP | 2000-113897 A | 4/2000 |
| JP | 2001-196079 A | 7/2001 |
| JP | 2002-151111 A | 5/2002 |
| JP | 2002-530836 A | 9/2002 |

OTHER PUBLICATIONS

English Translation of the German Office Action, dated Jul. 21, 2005.
Japanese Language Version of Japanese Office Action, Appl. No. 2003-032619 dated Nov. 28, 2006.
English Translation of Japanese office Action, Appl. No. 2003-032619 dated Nov. 28, 2006.

* cited by examiner

SEPARATOR PASSAGE STRUCTURE OF FUEL CELL

INCORPORATION BY REFERENCE

The disclosure of Japanese Patent Application No. 2003-032619 filed on Feb. 10, 2003 including the specification, drawings and abstract is incorporated herein by reference in its entirety.

BACKGROUND OF THE INVENTION

1. Field of the Invention

The invention relates to a separator passage structure of a fuel cell, particularly a proton-exchange membrane fuel cell.

2. Description of the Related Art

A unit cell of a proton-exchange membrane fuel cell is composed of a stack body formed by stacking a membrane-electrode assembly (hereinafter, referred to as MEA) and a separator. The MEA includes an electrolyte membrane composed of an ion-exchange membrane, an electrode (anode, fuel electrode) composed of a catalytic layer disposed on one surface of the electrolyte membrane, and another electrode (cathode, air electrode) composed of another catalytic layer disposed on the other surface of the electrolyte membrane. A diffusion layer is provided between the MEA and the separator. In the separator, passages through which a fuel gas (hydrogen) and an oxidizing gas (oxygen, generally air) are supplied to the anode and the cathode, and a passage through which a refrigerant (generally a coolant) passes are provided. A module includes at least one unit cell. A cell stack body is formed by stacking the modules. A terminal, an insulator, and an end plate are disposed at each of both ends of the cell stack body in a direction in which the cells are stacked (hereinafter, referred to as "cell stacked direction"). The cell stack body is fastened by using a fastening member which is disposed outside the cell stack body and which extends in the cell stacked direction (e.g., a tension plate), whereby a fuel cell stack is formed. In the proton-exchange membrane fuel cell, the reaction which decomposes hydrogen into a hydrogen ion and an electron occurs on the anode side, and the hydrogen ion moves to the cathode side through the electrolyte membrane. The reaction which produces water from oxygen, the hydrogen ion, and the electron (the electron generated on the anode side of the adjacent MEA moves to the cathode side through the separator) occurs on the cathode side.

Anode side: $H_2 \rightarrow 2H^+ + 2e^-$ 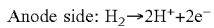

Cathode side: $2H^+ + 2e^- + (\frac{1}{2})O_2 \rightarrow H_2O$ 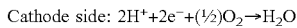

A concave groove and a convex rib are formed in the separator. The concave groove on a surface of the separator which faces the MEA constitutes a gas passage through which the fuel gas or the oxidizing gas passes. The convex rib contacts the diffusion layer, and constitutes a conductive passage. When a metal separator is used as the separator, the concave groove and the convex rib are generally formed by press molding. The rear surface of the convex rib (i.e., the surface opposite to the surface facing the MEA) constitutes a refrigerant passage. Japanese Patent Laid-Open Publication No. 2001-196079 discloses a separator passage structure of a fuel cell, in which multiple convex portions are regularly disposed on a surface of a metal separator so as to be separated from each other, and the gas flows between the convex portions, that is, a divided convex portion structure.

However, there are the following problems concerning this separator passage structure of a fuel cell. i) It is difficult to make both the gas and the refrigerant flow smoothly. ii) It is difficult to reduce the size of the separator in the cell stacked direction, and thus, it is difficult to make the stack small.

The reason why these problems occur, for example, in the case where the metal separator is used will be described. First, the reason why the problem concerning the flow of the gas and the flow of the refrigerant occurs will be described. Flooding may occur in a part of a surface of the separator, and the gas passage may be blocked due to the flooding. Therefore, it is preferable that a gas cross groove should be formed on each of the convex ribs between the gas passages, and the convex rib should be divided in a direction in which the gas passage extends so that the gas can flow from one gas passage to another adjacent gas passage when the one gas passage is blocked. In this case, the depth of the refrigerant passage on the rear surface of the convex rib is reduced, or the refrigerant passage is divided due to formation of the gas cross groove. As a result, there arise a problem concerning the flow of the refrigerant. Thus, it is difficult to allow the gas to flow smoothly using the gas cross groove when flooding occurs, and to allow the refrigerant to flow smoothly in the refrigerant passage on the rear surface of the convex rib at the same time. Next, the reason why the problem concerning the size of the separator in the cell stacked direction occurs will be described. When the depth of the gas cross groove formed on the convex rib is reduced so that the refrigerant passage on the rear surface of the gas cross groove is provided, the thickness of the separator is the sum of the depth of the gas cross groove and the depth of the refrigerant passage on the rear surface of the convex rib. Therefore, when the gas cross groove with a necessary depth and the refrigerant passage with a necessary depth are provided, the size of the separator in the thickness direction, i.e., in the cell stacked direction inevitably increases. Consequently, it is difficult to make the stack small in the cell stacked direction.

SUMMARY OF THE INVENTION

It is an object of the invention to provide a separator passage structure of a fuel cell, which allows both a gas and a refrigerant to flow smoothly. It is another object of the invention to provide a separator passage structure of a fuel cell which can keep a separator compact.

An aspect of the invention for achieving the aforementioned objects relates to a fuel cell including at least one unit cell. The unit cell includes a first separator which is disposed on one side of an MEA, and which includes a first concave groove which constitutes a first gas passage, and a first convex rib whose rear surface constitutes a first refrigerant passage, and on which a first gas cross groove is formed; and a second separator which is disposed on the other side of the MEA, and which includes a second concave groove which constitutes a second gas passage, and a second convex rib whose rear surface constitutes a second refrigerant passage, and on which a second gas cross groove is formed. An integral refrigerant passage is formed by combining the first refrigerant passage and the second refrigerant passage in a cell stacked direction when a plurality of the first separators and a plurality of the second separators are stacked. The integral refrigerant passage whose cross sectional area in a direction in which the integral refrigerant passage extends is equal to or larger than that of the first refrigerant passage and that of the second refrigerant passage In the aforementioned separator of the fuel cell according to the aspect of the invention, the first gas cross groove is formed on the convex rib of the first separator, and the second gas cross groove is formed on the convex rib of the second separator. Therefore, even if one gas passage is blocked due to flooding occurring in a part of the separator surface, the gas can flow to an adjacent gas passage through the gas cross groove. Thus, it is possible to ensure the flow of the gas, and to avoid the situation in which electric power cannot be generated in the entire gas passage. Also, the integral refrigerant passage has a cross sectional area which is equal to or larger than that of the first refrigerant passage, and which is equal to or larger than that of the second refrigerant passage at any portion in a direction in which the integral refrigerant passage extends. Therefore, the integral refrigerant passage is not divided by the gas cross groove, and the refrigerant can flow smoothly in the refrigerant passage. As a result, both the gas and the refrigerant can flow smoothly.

Another aspect of the invention relates to a fuel cell including at least one unit cell. The unit cell includes a first separator which is disposed on one side of an MEA, and which includes a first concave groove which constitutes a first gas passage, and a first convex rib whose rear surface constitutes a first refrigerant passage, and on which a first gas cross groove is formed; and a second separator which is disposed on the other side of the MEA, and which includes a second concave groove which constitutes a second gas passage, and a second convex rib whose rear surface constitutes a second refrigerant passage, and on which a second gas cross groove is formed. In an integral refrigerant passage formed by combining the first refrigerant passage and the second refrigerant passage in a cell stacked direction when a plurality of the first separators and a plurality of the second separators are stacked, a position of the first gas cross groove and a position of the second gas cross groove are deviated from each other in a direction in which the integral refrigerant passage extends.

With this configuration, the first gas cross groove is formed on the convex rib of the first separator, and the second gas cross groove is formed on the convex rib of the second separator. Therefore, even if one gas passage is blocked due to flooding occurring in a part of the separator surface, the gas can flow to an adjacent gas passage through the gas cross groove. Thus, it is possible to ensure the flow of the gas, and to avoid the situation in which electric power cannot be generated in the entire gas passage. Also, the position of the first gas cross groove of the first separator and the second gas cross groove of the second separator are deviated from each other in the direction in which the integral refrigerant passage extends. Therefore, the refrigerant passage is not divided by the gas cross groove, and the refrigerant can flow smoothly in the refrigerant passage. As a result, both the gas and the refrigerant can flow smoothly. Also, since the position of the first gas cross groove of the first separator and the second gas cross groove of the second separator are deviated from each other in the direction in which the integral refrigerant passage extends, it is not necessary to increase the depth of the refrigerant passages of each of the first separator and the second separator, and thus it is not necessary to increase the thickness of each of the first separator and the second separator in order to allow the refrigerant to flow smoothly. As a result, the size of the stack does not need to be increased in the cell stacked direction although the gas cross grooves are provided, and thus the stack is kept compact.

In the aforementioned aspect of the invention, the first concave groove and the first convex rib may be provided in plurality, and may be positioned in parallel with each other in a direction in which the first concave groove and the first convex rib extend, and the first gas cross groove may be formed in a direction perpendicular to the direction in which the first convex rib extends, and may cross-link at least two of the first concave grooves; and the second concave groove and the second convex rib may be provided in plurality, and may be positioned in parallel with each other in a direction in which the second concave groove and the second convex rib extend, and the second gas cross groove may be formed in a direction perpendicular to the direction in which the second convex rib extends, and may cross-link at least two of the second concave grooves.

Further, in the aforementioned aspect of the invention, the first gas cross groove and the second gas cross groove may be provided in plurality, and may be alternately positioned in the direction in which the integral refrigerant passage extends, and intervals, each of which is between the first gas cross groove and the second gas cross groove that are adjacent to each other, may be substantially the same. With this configuration, since the first gas cross grooves and the second gas cross grooves are alternately positioned in the direction in which the integral refrigerant passage extends, and intervals, each of which is between the first gas cross groove and the second gas cross groove that are adjacent to each other, is substantially the same, the cross sectional area of the refrigerant passage remains substantially the same in a direction in which the refrigerant passage extends, and thus the refrigerant can flow smoothly.

Further, in the aforementioned aspect of the invention, the first separator may be a metal separator, and the first concave groove, the first convex rib, and the first gas cross groove may be formed by press molding; and the second separator may be a metal separator, and the second concave groove, the second convex rib, and the second gas cross groove may be formed by press molding. Thus, even when each of the first separator and the second separator is a metal separator, it is possible to allow both the gas and the refrigerant to flow smoothly by forming the first gas cross groove and the second gas cross groove on the separator, and alternately positioning the first gas cross groove and the second gas cross groove.

In the aforementioned aspect of the invention, the depth of the first gas cross groove may be equal to the height of the first concave rib, and the depth of the second gas cross groove may be equal to the height of the second concave rib. With this configuration, the gas cross groove is formed to have the depth which is equal to the entire height of the concave rib, and the gas cross groove is not provided at a portion of one separator which corresponds to the gas cross groove of another separator which overlaps the one separator. Therefore, the cross sectional area of the refrigerant passage is substantially the same in the direction in which the refrigerant passage extends, and the separator can be made compact in the cell stacked direction.

In the aforementioned aspect of the invention, the first convex rib and the second convex rib may contact the MEA, and each of the proportion of a contacting area between all the first convex ribs and the MEA and the proportion of a contacting area between the all the second convex ribs and the MEA may be 20% to 40%. The width of each of the first convex rib and the second convex rib may be 0.5 mm to 1.5 mm. The height of each of the first convex rib and the second convex rib may be 0.3 mm to 0.6 mm. Each of the pitch between the first gas cross grooves and the pitch between the second gas cross grooves may be 2 mm to 50 mm. Each of the length of the first gas cross groove in a direction in which the first convex rib extends and the length of the second gas cross groove in a direction in which the second convex rib extends may be 0.5 mm to 3 mm. The width of each of the first concave groove and the second concave groove may be 0.5 mm to 3 mm. These are exemplary shapes and size of the convex rib and the concave groove.

DETAILED DESCRIPTION OF THE PREFERRED EMBODIMENTS

Hereinafter, a separator passage structure of a fuel cell according to the invention will be described with reference to FIG. 1 to FIG. 12. FIG. 12 shows a comparative example (the comparative example is not included in the invention). The separator passage structure of a fuel cell according to the invention is applied to a proton-exchange membrane fuel cell 10. The fuel cell 10 is installed, for example, in a fuel cell vehicle. However, the fuel cell 10 may be used for systems other than a vehicle.

Figure 1:
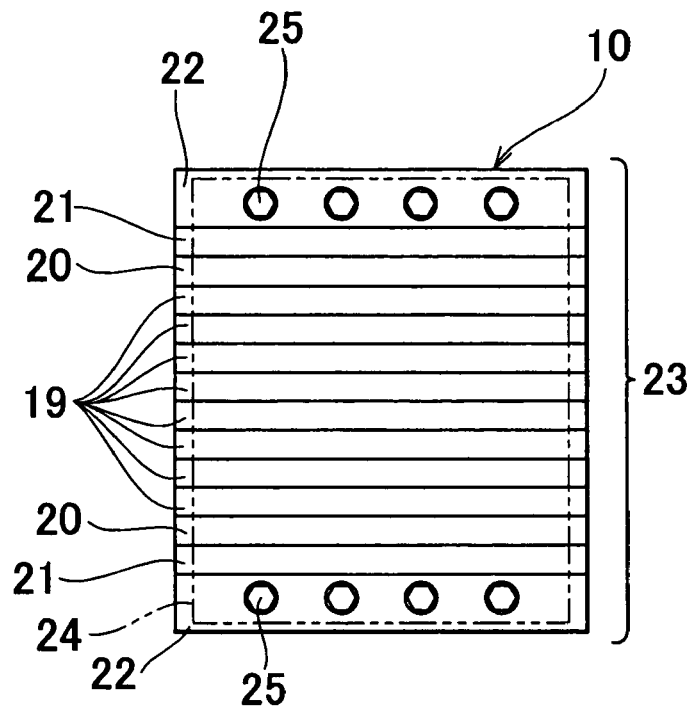
FIG. 1 is a schematic view showing an entire fuel cell to which the invention is applied in a manner in which a cell stacked direction is a vertical direction.
Figure 2:
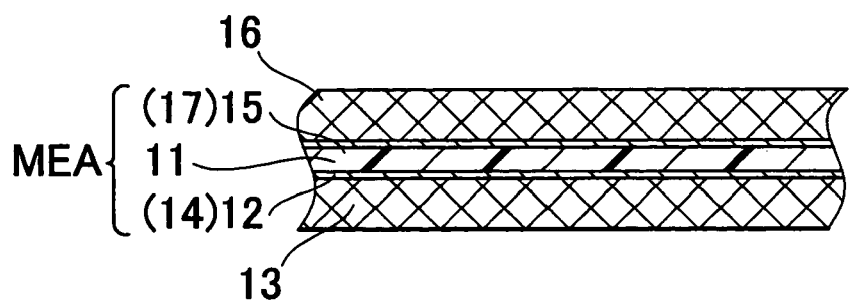
FIG. 2 is an enlarged sectional view showing a part of membrane-electrode assembly of the fuel cell in FIG. 1.

A unit cell 19 of the proton-exchange membrane fuel cell 10 is formed by stacking a membrane-electrode assembly and a separator 18, as shown in FIG. 1 to FIG. 11. As shown in FIG. 2, the MEA includes an electrolyte membrane 11 composed of an ion-exchange membrane, an electrode 14 (anode, fuel electrode) composed of a catalytic layer 12 disposed on one surface of the electrolyte membrane 11, and an electrode 17 (cathode, air electrode) composed of a catalytic layer 15 disposed on the other surface of the electrolyte membrane 11. A diffusion layer 13 is provided between the electrode 14 and the separator 18. A diffusion layer 16 is provided between the electrode 17 and the separator 18. As shown in FIG. 3 to FIG. 6, in the separator 18, reaction gas passages 27, 28 through which a fuel gas (hydrogen) and an oxidizing gas (oxygen, generally air) are supplied to the electrode 14 and the electrode 17, and a refrigerant passage (it is also referred to as "coolant passage") 26 through which a refrigerant (generally a coolant) passes are provided. The refrigerant passage 26 is provided for each cell, or for each group of plural cells. A module includes at least one unit cell (one cell constitutes one module in the example shown in the drawing). A module group is formed by stacking the modules. A terminal 20, an insulator 21, and an end plate 22 are disposed at each of both ends of the cell stack body in the cell stacked direction as shown in FIG. 1. The cell stack body is fastened by using a fastening member 24 which is disposed outside the cell stack body and which extends in the cell stacked direction (e.g., a tension plate, or a through bolt) and a bolt 25 or a nut, whereby a fuel cell stack 23 is formed.

The catalytic layers 12, 15 are made of platinum (Pt), carbon (C), and electrolyte. The diffusion layers 13, 16 are made of carbon (C). As shown in FIG. 3 to FIG. 9, the separator 18 includes a first separator 18A, a second separator 18B, a first resin frame 18C, and a second resin frame 18D. Each of the first resin frame 18C and the second resin frame 18D has a hollow portion at a portion 29 corresponding to a power generation portion of the fuel cell (hereinafter, referred to as "power generation corresponding portion".

The first separator 18A and the first resin frame 18C are disposed on the fuel electrode side of the MEA. The first separator 18A separates the fuel gas and the coolant. The second separator 18B and the second resin frame 18D are disposed on the air electrode side of the MEA. The second separator 18B separates the oxidizing gas and the coolant. The first separator 18A and the second separator 18B are made of metal. Hereinafter, they will be also referred to as "metal separator 18A" and "metal separator 18B". The first resin frame 18C and the second resin frame 18D are made of resin (nonconductive resin).

Figure 4:
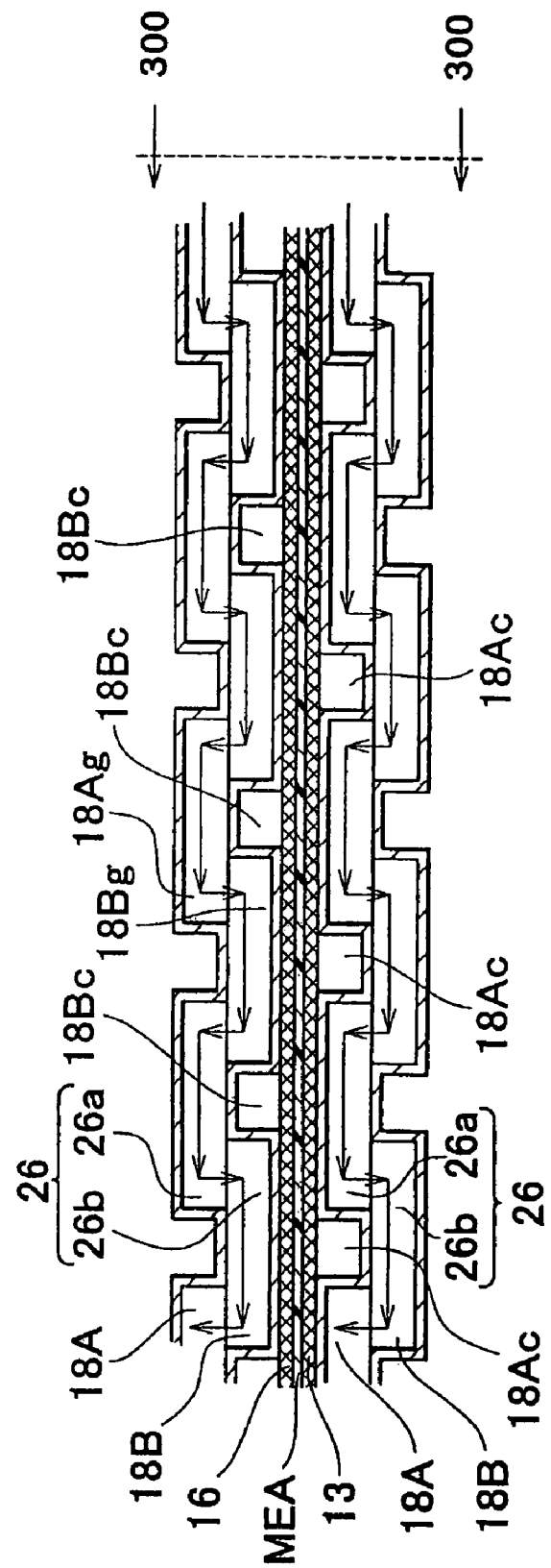
FIG. 4 is a sectional view showing a part of a unit cell to which the separator passage structure of a fuel cell according to the invention is applied, which is taken along line 100 to 100 in FIG. 3.
Figure 5:
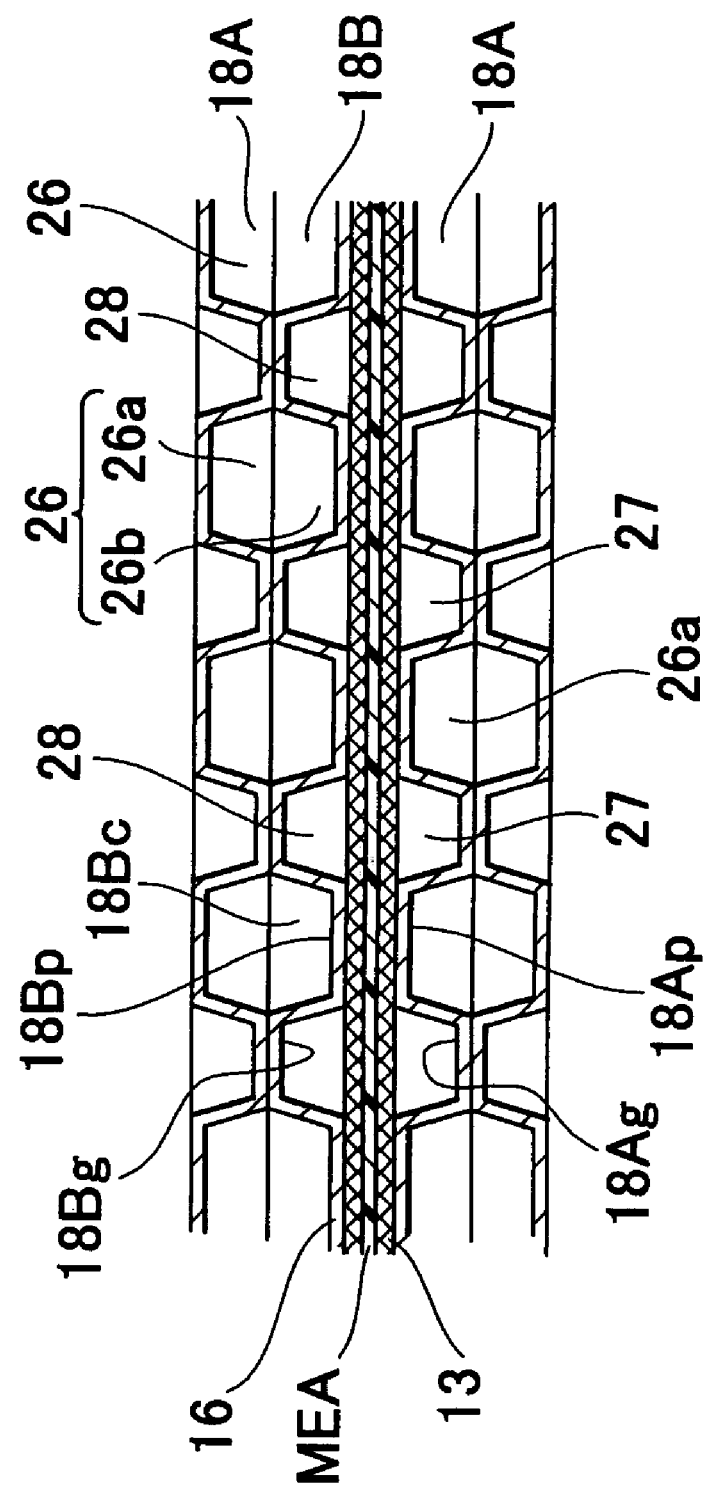
FIG. 5 is a sectional view showing the separator passage structure of a fuel cell in FIG. 4, which is taken along line 300 to 300 in FIG. 4
Figure 6:
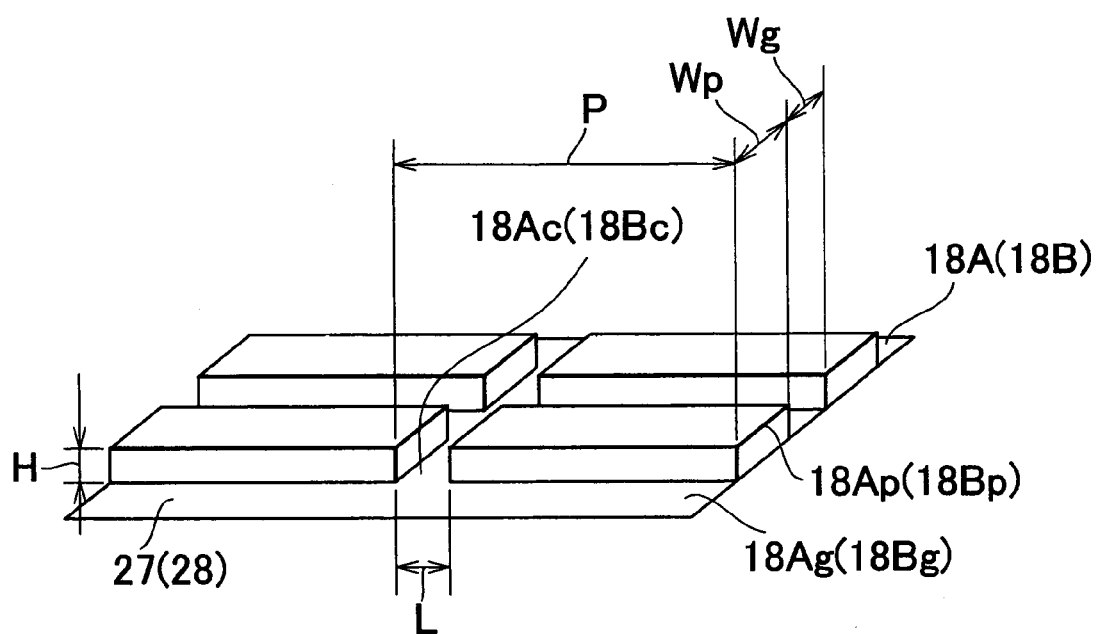
FIG. 6 is a perspective view showing a part of the separator passage structure of a fuel cell according to the invention.
Figure 8:
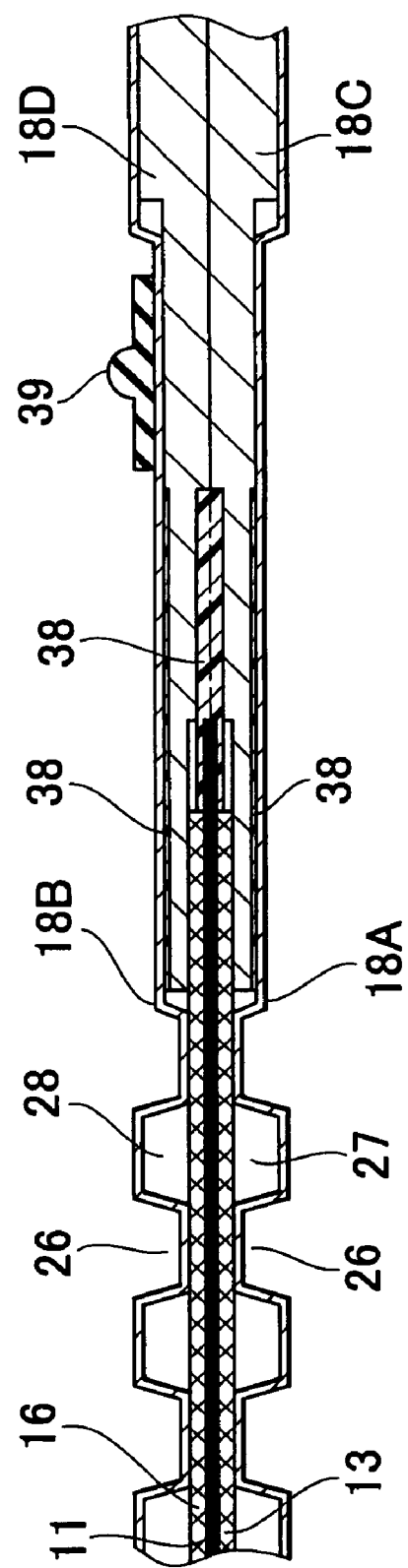
FIG. 8 is a sectional view taken along line 400 to 400 in FIG. 7.
Figure 9:
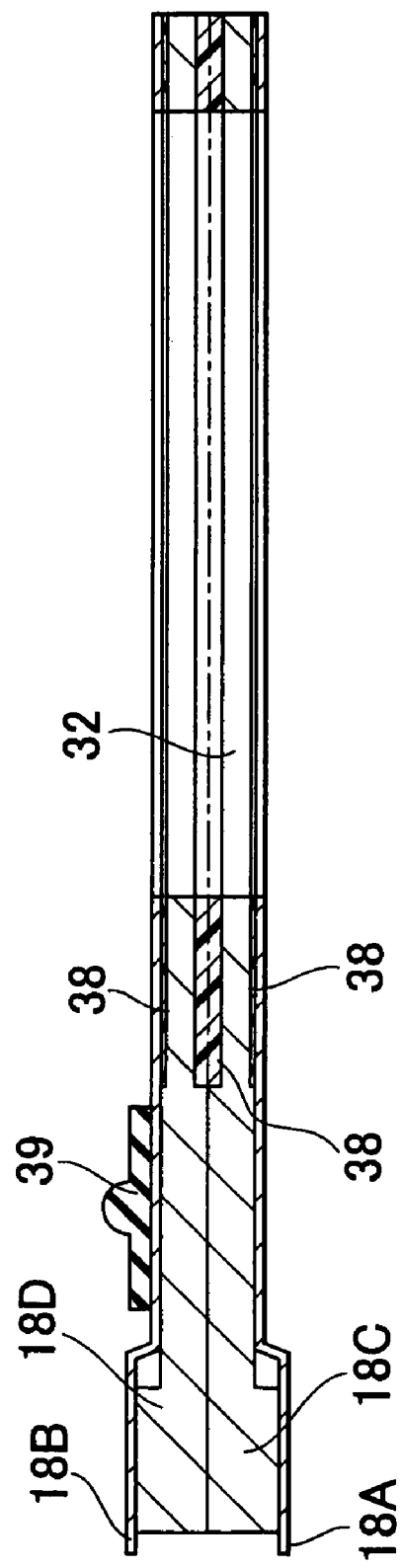
FIG. 9 is a sectional view taken along line 200 to 200 in FIG. 7.

The MEA is sandwiched between the metal separator 18A and the metal separator 18B. When the MEA is sandwiched between the metal separator 18A and the metal separator 18B, the resin frame 18C is disposed on the MEA side of the metal separator 18A, and the resin frame 18D is disposed on the MEA side of the metal separator 18B. Thus, the metal separator 18A, the resin frame 18C, the MEA, the resin frame 18D, and the metal separator 18B are stacked in this order. Since each of the resin frames 18C, 18D has a hollow portion in the power generation corresponding portion 29, the metal separator 18A, the MEA, the metal separator 18B are stacked in this order in the power generation corresponding portion 29, as shown in FIG. 4 and FIG. 5. In a portion other than the power generation corresponding portion 29, the metal separator 18A, the resin frame 18C, the resin frame 18D, and the metal separator 18B are stacked in this order, as shown in FIG. 8 and FIG. 9.

Figure 3:
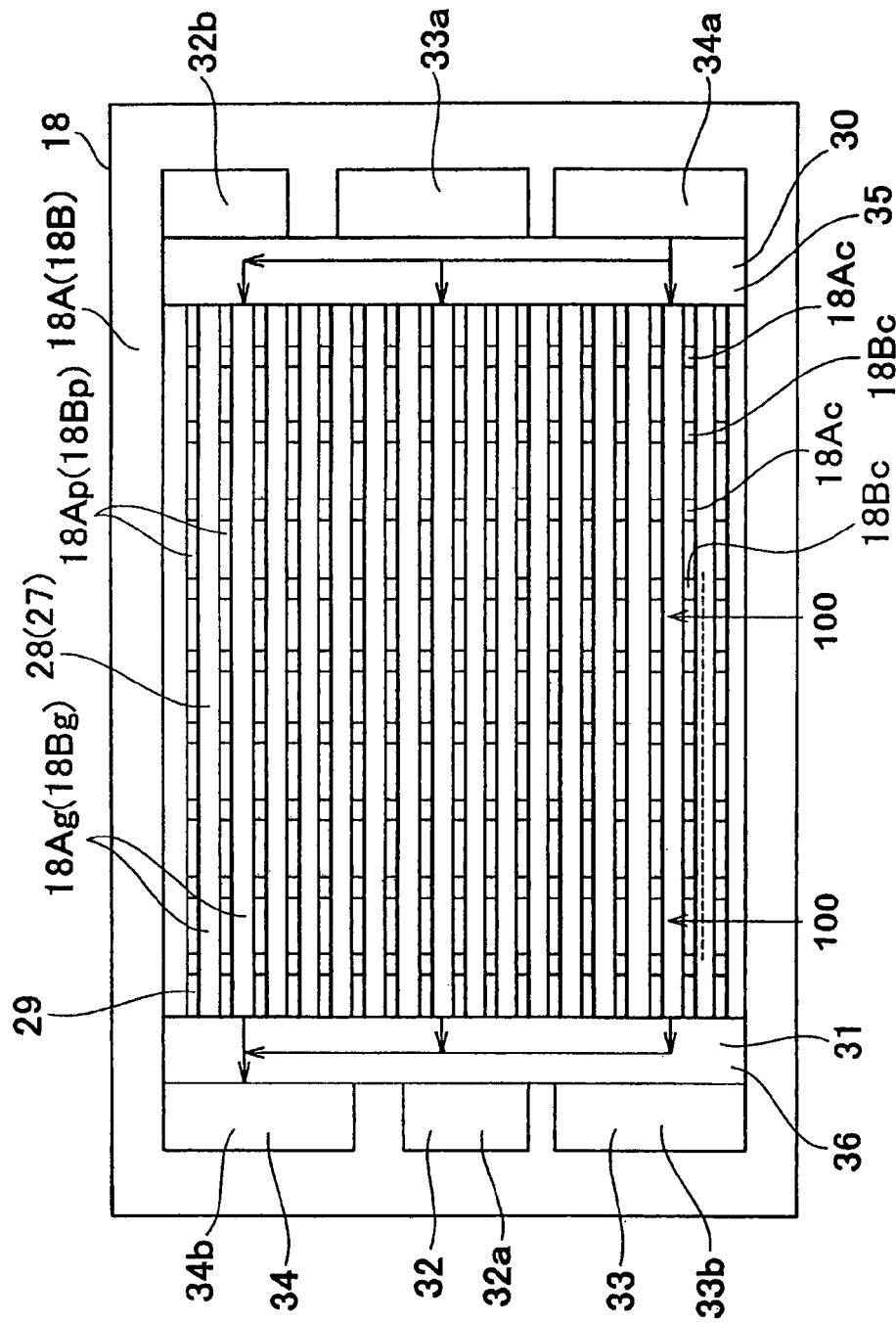
FIG. 3 is a plan view showing a separator to which a separator passage structure of a fuel cell according to the invention is applied.

In the unit cell 19, concave portions and convex portions (concave grooves and convex ribs) are formed by press molding on the first separator 18A and the second separator 18B. The first gas passage (fuel gas passage) 27 is formed on the MEA side of the first separator 18A, and the refrigerant passage 26 is formed on the side opposite to the MEA side of the first separator 18A. The second gas passage (oxidizing gas passage) 28 is formed on the MEA side of the second separator 18B, and the refrigerant passage 26 is formed on the side opposite to the MEA side of the second separator 18B. Each of the fuel gas passage 27 and the oxidizing gas passage 18 includes a passage group formed by arranging plural passages in parallel. FIG. 3 shows the case where the straight passages are provided. However, serpentine passages may be provided.

As shown in FIG. 3, a fuel gas inlet and a fuel gas outlet of the fuel gas passage 27 in the power generation corresponding portion 29 of the separator 18 are provided so as to face each other across the power generation corresponding portion 29 (i.e., the fuel gas inlet and the fuel gas outlet are provided on opposite sides of the portion 29). Similarly, an oxidizing gas inlet and an oxidizing gas outlet of the oxidizing gas passage 28 in the power generation corresponding portion 29 of the separator 18 are provided so as to face each other across the power generation corresponding portion 29 (i.e., the oxidizing gas inlet and the oxidizing gas outlet are provided on the opposite sides of the portion 29).

A manifold portion is formed in each of facing portions 30, 31 which face each other across the power generation corresponding portion 29 in each of the metal separators 18A, 18B, and the resin frames 18C, 18D. In the manifold portion, a refrigerant manifold 32, a fuel gas manifold 33, and an oxidizing gas manifold 34 are formed. In the facing portion 31, an inlet side refrigerant manifold 32a, an outlet side fuel gas manifold 33b, and an outlet side oxidizing gas manifold 34b are provided. In the other facing portion 30, an outlet side refrigerant manifold 32b, an inlet side fuel gas manifold 33a, and an inlet side oxidizing gas manifold 34a are provided.

Figure 7:
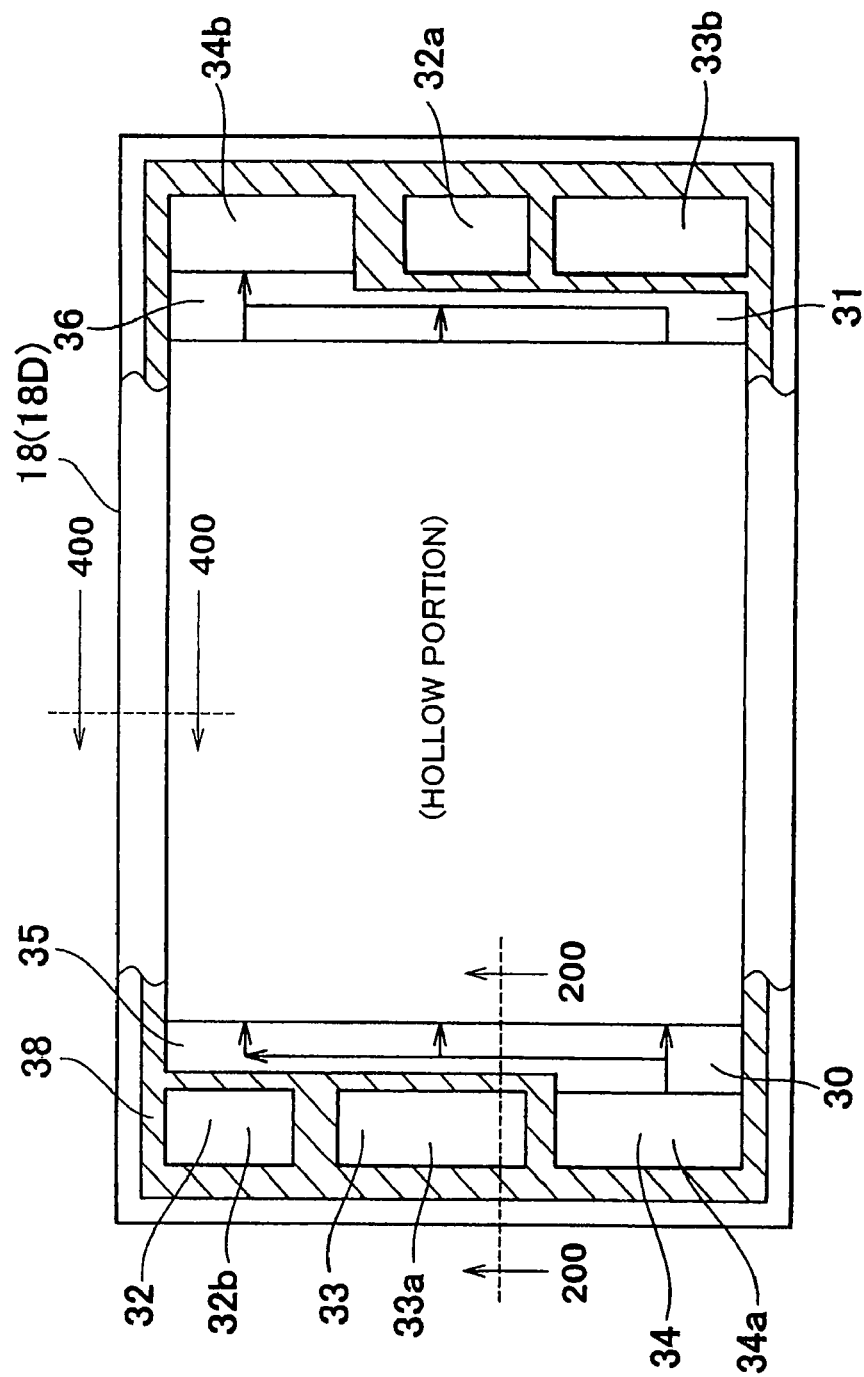
FIG. 7 is a plan view showing a resin frame of the separator of the fuel cell to which the invention is applied.

A gas passage communication portion which provides communication between the manifold portion and the gas passage portion is provided in each of the resin frame 18C and the resin frame 18D, as shown in FIG. 7 (FIG. 7 shows the resin frame 18D, but the resin frame 18C is similar to the resin frame 18D). In the gas passage communication portion, gas flow directing portions 35, 36 are formed. The gas flow directing portions 35, 36 direct the flow of the gas in a direction orthogonal to a line connecting the facing portions 30, 31, and allow the gas to be uniformly diffused or to be concentrated in the direction orthogonal to the line connecting the facing portions 30, 31 between the gas passage portion and the manifold portion. That is, the gas flow directing portion 35 allows the gas flowing therein from the inlet side gas manifold to be diffused over the entire width of the gas passage portion and to flow into the gas passage portion. The gas flow directing portion 36 allows the gas flowing therein from the gas passage portion to be concentrated and to flow into the gas manifold.

A rubber gasket 39 is provided between the metal separators adjacent to each other between the cells so that sealing is provided among the refrigerant manifold 32, the fuel gas manifold 33, and the oxidizing gas manifold 34, as shown in FIG. 8 and FIG. 9. As the rubber gasket 39, an O-ring or the like may be used. An adhesive sealing portion 38 to which an adhesive agent is applied (a diagonally shaded portion in FIG. 7) is formed in each of the resin frames 18C, 18D so as to provide sealing between the resin frame and the member adjacent to the resin frame in the cell stacked direction (i.e., the metal separator or the resin frame), and to provide sealing among the refrigerant manifold 32, the fuel gas manifold 33, and the oxidizing gas manifold 34, as shown in FIG. 7, FIG. 8, and FIG. 9.

The separator passage structure according to the invention is as follows. As shown in FIG. 3 to FIG. 6, in the power generation corresponding portion 29 of the unit cell 19, the first separator 18A which is disposed on one side of the MEA includes concave grooves 18Ag and convex ribs 18Ap, and the second separator 18B which is disposed on the other side of the MEA includes concave grooves 18Bg and convex ribs 18Bp. The concave grooves 18Ag constitute the fuel gas passage 27. The rear surfaces of the convex ribs 18Ap constitute a first refrigerant passage 26a. The concave grooves 18Bg constitute oxidizing gas passage 28, and the rear surfaces of the convex ribs 18Bp constitute a second refrigerant passage 26b. Each of the concave grooves 18Ag and the concave grooves 18Bg opens toward the MEA. The top surface of each of the convex ribs 18Ap and the convex ribs 18Bp contacts the diffusion layer.

The first refrigerant passage 26a of the first separator 18A of one cell 19 and the second refrigerant passage 26b of the second separator 18B of the adjacent cell 19 are provided at the same position in the cell stacked direction so as to form the integral refrigerant passage 26. That is, the refrigerant passage 26 on the surface of the power generation corresponding portion 29 of the separator 18A of one cell 19 on the side opposite to the MEA side is not separated from the refrigerant passage 26 on the surface of the power generation corresponding portion 29 of the separator 18B of the adjacent cell on the side opposite to the MEA side, and communication is provided between both the refrigerant passages 26. In one cell 19, the fuel gas passage 27 corresponds to the oxidizing gas passage 28 on the both sides of the MEA.

First gas cross grooves (fuel gas cross grooves) 18Ac are formed on each convex rib 18Ap of the first separator. Second gas cross grooves (oxidizing gas cross grooves) 18Bc are formed on each convex rib 18Bp of the second separator 18B. Each of the fuel gas cross grooves 18Ac provides communication between the convex grooves 18Ag constituting the fuel gas passage 27 on both sides of the convex rib 18Ap. Each of the oxidizing gas cross grooves 18Bc provides communication between the concave grooves 18Bg on both sides of the convex rib 18Bp. The integral refrigerant passage 26 has a cross sectional area which is equal to or larger than that of the first refrigerant passage 26a, and which is equal to or larger than that of the second refrigerant passage 26b at any portion in a direction in which the integral refrigerant passage 26 extends. That is, the cross sectional area of the refrigerant passage 26 is equal to or larger than that of the refrigerant passage 26a, and is equal to or larger than that of the refrigerant passage 26b.

The fuel gas cross groove 18Ac formed on the convex rib 18Ap of the first separator 18A and the oxidizing gas cross groove 18Bc formed on the convex rib 18Bp of the second separator 18B are provided at different positions in a direction in which the integral refrigerant passage extends (that is, the position of the fuel gas cross groove 18Ac and the position of the oxidizing gas cross groove 18Bc are deviated from each other), as shown in FIG. 4. More particularly, the fuel gas cross grooves 18Ac of the first separator 18A and the oxidizing gas cross grooves 18Bc of the second separator 18B are alternately positioned in the direction in which the integral refrigerant passage 26 extends. In addition, the fuel gas cross groove 18Ac is positioned at a substantially center between the oxidizing gas cross grooves 18Bc on both sides of the fuel gas cross groove 18Ac, and the oxidizing gas cross groove 18Bc is positioned at a substantially center between the fuel gas cross grooves 18Ac on both sides of the oxidizing gas cross groove 18Bc.

The first separator 18A and the second separator 18B are metal separators. The concave groove, the convex rib, and the gas cross groove on each of the first separator 18A and the second separator 18B are all formed by press molding the metal separator. The gas cross groove 18Ac is formed to have a depth which is equal to the entire height of the convex rib 18Ap, and the gas cross groove 18Bc is formed to have a depth which is equal to the entire height of the convex rib 18Bp.

It is preferable that the specific shapes and dimensions of the concave groove, the convex rib, and the gas cross groove should be set as follows. Each of the proportion of the contacting area between all the convex ribs 18Ap and the MEA, and the proportion of the contacting area between all the convex ribs 18Bp and the MEA is set to 20% to 40% in order to secure the performance by reducing contact resistance between the rib and the electrode, and obtaining a sufficient reaction area in which the gas contacts the electrode. This is because when the proportion of the area contacting the MEA is lower than 20%, the contact electric resistance loss becomes extremely large, and when the proportion is higher than 40%, the gas cannot be effectively diffused to a portion of the diffusion layer which is pressed by the rib, and thus the electric power generation performance deteriorates.

A width Wp of each of the convex ribs 18Ap, 18Bp is set to 0.5 mm to 1.5 mm in order to effectively diffuse the gas. This is because when the width Wp is smaller than 0.5 mm, the MEA cannot be sandwiched between the convex ribs 18Ap, 18Bp facing each other if the convex ribs 18Ap, 18Bp are deviated from each other, and when the width Wp is larger than 1.5 mm, the gas cannot be effectively diffused to a portion of the diffusion layer which is pressed by the rib. Each of a pitch P between the gas cross grooves 18Ac and a pitch P between the gas cross grooves 18Bc is set to 2 mm to 50 mm. This is because when the pitch P is smaller than 2 mm, an area contacting the diffusion layer in each of the convex ribs 18Ap, 18Bp decreases and the contact resistance loss increases, and when the pitch P is larger than 50 mm, a portion where the gas cannot flow smoothly increases if water is generated. A length L of each of the gas cross grooves 18Ac, 18Bc in a direction in which the convex rib extends is set to 0.5 mm to 3 mm. This is because when the length L is smaller than 0.5 mm, the gas cross grooves 18Ac, 18Bc are blocked by water and a bypass passage cannot be formed easily, and when the length L is larger than 3 mm, a portion of the diffusion layer which is not pressed by each of the convex ribs 18Ap, 18Bp becomes extremely long, and the portion of the diffusion layer may bend so as to be separated from the MEA.

A width Wg of each of the gas convex grooves 18Ag, 18Bg is set to 0.5 mm to 3 mm in order to effectively diffuse the gas and to obtain the sufficient reaction area, and considering support for the diffusion layer, electronic conduction, and heat conduction. This is because when the width Wg is smaller than 0.5 mm, it becomes difficult to effectively diffuse the gas and to obtain the sufficient reaction area, and when the width Wg is larger than 3 mm, it becomes difficult to support the diffusion layer. A height of each of the convex ribs 18Ap, 18Bp is set to 0.3 mm to 0.6 mm considering the flow rate of the gas, pressure loss, drainage, and press moldability. This is because when the height H is smaller than 0.3 mm, the pressure loss becomes extremely large, and when the height H is larger than 0.6 mm, the press moldability deteriorates, and the stack becomes extremely long.

Next, effects of the separator passage structure of a fuel cell according to the invention will be described. The fuel gas cross grooves 18Ac are formed on each convex rib 18Ap of the first separator 18A, and the oxidizing gas cross grooves 18Bc are formed on each convex rib 18Bp of the second separator 18B. Therefore, even if one gas passage 27 or 28 is blocked due to flooding occurring in a part of the surface of the separator, the gas can flow to an adjacent gas passage 27 or 28 through the gas cross grooves 18Ac or 18Bc. Thus, it is possible to ensure the flow of the gas, and to avoid the situation in which electric power cannot be generated in the entire gas passage 27 or 28 that is blocked due to flooding. Even if flooding occurs in a part of the gas passage 27 or 28, only the part is blocked, and the gas remains flowing smoothly in the gas passage 27, 28, except the part blocked due to flooding.

Also, the integral refrigerant passage 26 has a cross sectional area which is equal to or larger than that of the first refrigerant passage 26a, and which is equal to or larger than that of the second refrigerant passage 26b at any portion in the direction in which the integral refrigerant passage 26 extends. Therefore, the integral refrigerant passage 26 is not divided by the gas cross passages 18Ac, 18Bc, and the refrigerant remains flowing smoothly in the integral refrigerant passage 26. More specifically, the position of the fuel gas cross groove 18Ac of the first separator 18A and the position of the oxidizing gas cross groove 18Bc of the second separator 18B are deviated from each other in the direction in which the integral refrigerant passage 26 extends. Therefore, the refrigerant passage 26 is not divided by the gas cross grooves 18Ac, 18Bc, and the refrigerant can flow smoothly in the refrigerant passage 26. As a result, the fuel gas, the oxidizing gas, and the refrigerant can flow smoothly.

Since the position of the fuel gas cross groove 18Ac of the first separator 18A and the position of the oxidizing gas cross groove 18Bc of the second separator 18B are deviated from each other in the direction in which the integral refrigerant passage 26 extends, even when the refrigerant passage 26a or 26b of one of the first separator 18A and the second separator 18B is divided by the gas cross grooves 18Ac or 18Bc, the refrigerant can smoothly flow through the refrigerant passage of the other separator. Accordingly, it is not necessary to increase the depth of the refrigerant passages of each of the first separator and the second separator, and thus it is not necessary to increase the thickness of each of the first separator and the second separator in order to allow the refrigerant to flow smoothly. As a result, the size of the stack 23 does not need to be increased in the cell stacked direction although the gas cross grooves are provided, and thus the stack 23 is kept compact. When the gas cross groove 18Ac and the gas cross groove 18Bc are provided at the same position in the direction in which the refrigerant passage 26 extends as shown in a comparative example in FIG. 12 (the comparative example is not included in the invention), it is necessary to decrease the depth of each of the gas cross groove 18Ac and the gas cross groove 18Bc such that the refrigerant passage remains on the rear surface of the groove bottom in order to allow the refrigerant to flow. However, in this case, there is a problem that the refrigerant cannot flow smoothly between the gas cross grooves 18Ac, 18Bc. Also, since the refrigerant passage has a large cross sectional area and a small cross sectional area, there is another problem that bubbles are easily generated in the refrigerant. In the invention, the positions of the gas cross grooves 18Ac, 18Bc are deviated from each other in the direction in which the refrigerant passage 26 extends. Therefore, the aforementioned problems in the comparative example are not caused.

As shown in FIG. 4, the fuel gas cross grooves 18Ac of the first separator 18A and the oxidizing gas cross grooves 18Bc of the second separator 18B are alternately positioned in the direction in which the integral refrigerant passage 26 extends. In addition, the fuel gas cross groove 18Ac is positioned at a substantially center between the oxidizing gas cross grooves 18Bc on both sides of the fuel gas cross groove 18Ac, and the oxidizing gas cross groove 18Bc is positioned at a substantially center between the fuel gas cross grooves 18Ac on both sides of the oxidizing gas cross groove 18Bc. Therefore, the cross sectional area of the refrigerant passage 26 is made substantially the same in the direction in which the refrigerant passage 26 extends, and thus the refrigerant can flow smoothly. Since the gas cross grooves 18Ac are formed on the first separator 18A, the gas cross grooves 18Bc are formed on the second separator 18B, and the gas cross grooves 18Ac and the gas cross grooves 18Bc are alternately positioned, it is possible to allow both the gas and the refrigerant to flow smoothly even when the first separator 18A and the second separator 18B are metal separators.

The gas cross groove 18Ac is formed to have a depth which is equal to the entire height of the convex rib 18Ap, and the gas cross groove 18Bc is formed to have a depth which is equal to the entire height of the convex rib 18Bp. Also, the gas cross groove is not provided at a portion of one separator which corresponds to the gas cross groove of another separator which overlaps the one separator. Therefore, the cross sectional area of the refrigerant passage 26 can be made substantially the same in the direction in which the refrigerant passage 26 extends, and the separator 18 can be made compact in the cell stacked direction. If the gas cross grooves of the two separators that overlap each other were provided at the same position in the direction in which the refrigerant passage 26 extends, it would be necessary to increase the height of the concave rib such that the refrigerant passage remains on the rear surface of the gas cross groove bottom. However, if the height of the concave rib were increased, it would not be possible to make the separator 18 compact in the cell stacked direction, and the length of the stack would be large.

Each of the proportion of the contacting area between all the convex ribs 18Ap and the MEA, and the proportion of the contacting area between all the convex ribs 18Bp and the MEA is set to 20% to 40%. The width of each of the convex ribs 18Ap, 18Bp is set to 0.5 mm to 1.5 mm. The pitch between the gas cross grooves 18Ac and between the gas cross grooves 18Bc is set to 2 mm to 50 mm. The length of each of the gas cross grooves 18Ac, 18Bc in the direction in which the convex rib extends is set to 0.5 mm to 3 mm. The width of each of the gas concave grooves is set to 0.5 mm to 3 mm. The height of each of the convex ribs 18Ap, 18Bp is set to 0.3 mm to 0.6 mm. Thus, it is possible to obtain the fuel cell in which the gas and the refrigerant flows smoothly, and the thickness of the cell and the length of the stack is small.

Figure 10:
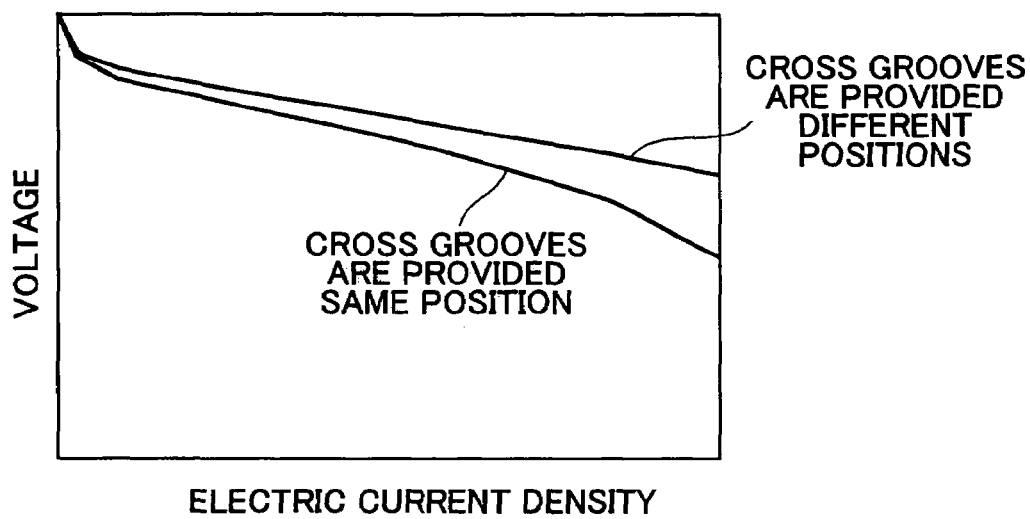
FIG. 10 is a graph showing voltage-electric current density characteristics in an embodiment of the invention in which gas cross grooves are provided at different positions in a direction in which a refrigerant passage extends, and in a comparative example in which the gas cross grooves are provided at the same position in the direction in which the refrigerant passage extends.

The performance of the fuel cell was evaluated by variously changing the shapes and dimensions of the gas cross groove and the convex rib. FIG. 10 is a graph showing voltage-electric current density characteristics in an embodiment of the invention and in a comparative example. In the embodiment of the invention, the gas cross grooves 18Ac, 18Bc are provided at different positions in the direction in which the refrigerant passage 26 extends (refer to FIG. 4), the depth of each of the gas cross grooves 18Ac, 18Bc is 0.5 mm, and the height of each of the convex ribs is 0.5 mm. In the comparative example, the gas cross grooves 18Ac, 18Bc are provided at the same position in the direction in which the refrigerant passage 26 extends (refer to FIG. 12), the depth of each of the gas cross grooves 18Ac, 18Bc is 0.25 mm, and the height of each of the convex ribs is 0.5 mm. As apparent from FIG. 10, the gas flows smoothly and the voltage drop is small even in a high electric current density region where large amount of water is generated in the invention. In the comparative example, the flow of the gas is inhibited due to flooding, and the voltage drop is large in the high electric current density region.

Figure 11:
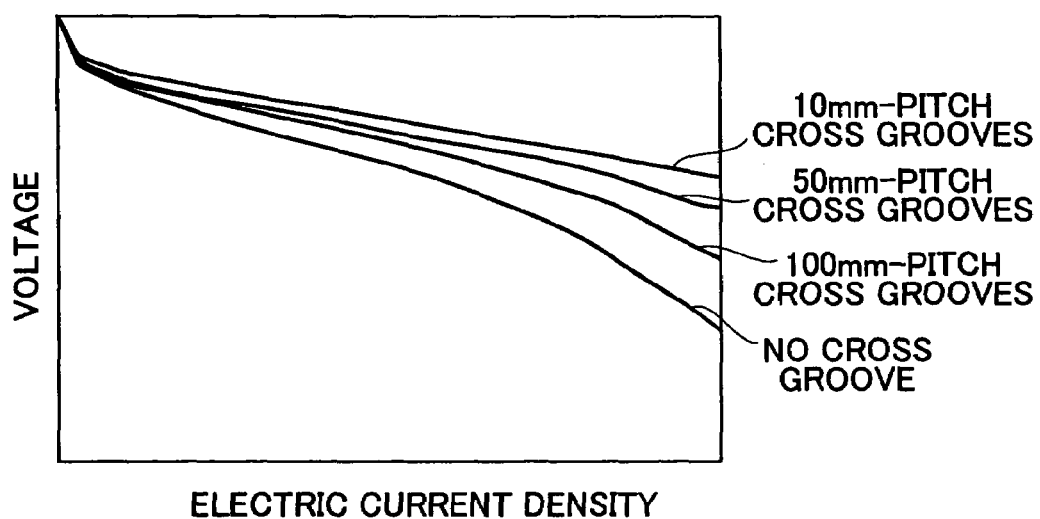
FIG. 11 is a graph showing the voltage-electric current density characteristics in the cases where the convex rib is divided by 10 mm-pitch gas cross grooves, 50 mm-pitch gas cross grooves, and 100 mm-pitch gas cross grooves, and in the case where the convex rib is not divided by gas cross grooves (the conventional case)
Figure 12:
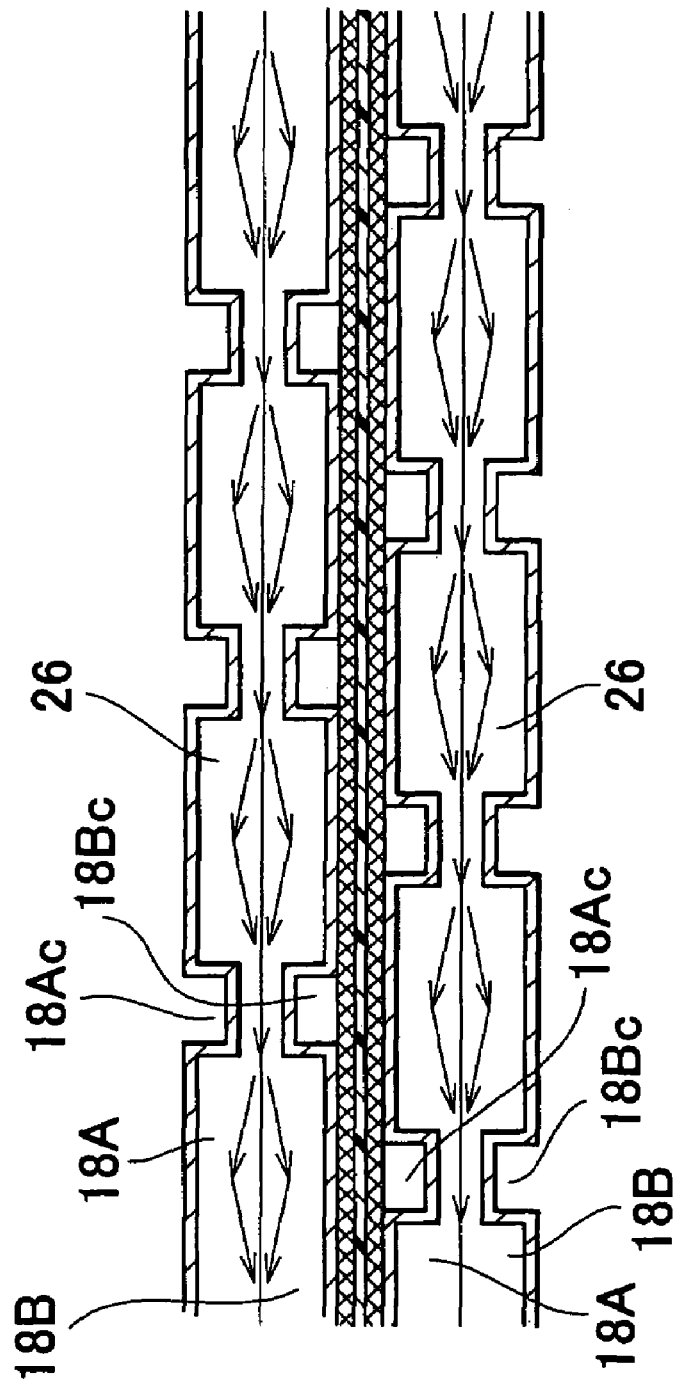
FIG. 12 is a sectional view showing a part of a separator passage structure in which cross grooves are provided at the same position in a direction in which a refrigerant passage extends according to a comparative example.

FIG. 11 is a graph showing the voltage-electric current density characteristics in the cases where the convex rib is divided by 10 mm-pitch gas cross grooves, 50 mm-pitch gas cross grooves, and 100 mm-pitch gas cross grooves, and in the case where the convex rib is not divided by gas cross grooves. As apparent from FIG. 11, in the case where the concave rib is divided by the gas cross grooves according to the invention, the flow of the gas is prevented from being stopped in the entire gas passage even if a part of the gas passage is blocked due to flooding, and therefore the voltage drop is small. Meanwhile, in the case where the concave rib is not divided according to the comparative example, the gas flow is stopped in the entire gas passage if a part of the gas passage is blocked due to flooding, and therefore the voltage drop is large.

What is claimed is:

1. The fuel cell comprising:
at least one unit cell including a first separator which is disposed on one side of a membrane-electrode assembly, and which includes a first concave groove which constitutes a first gas passage, and a first convex rib whose rear surface constitutes a first refrigerant passage, and on which a first gas cross groove is formed; and a second separator which is disposed on the other side of the membrane-electrode assembly, and which includes a second concave groove which constitutes a second gas passage, and a second convex rib whose rear surface constitutes a second refrigerant passage, and on which a second gas cross groove is formed, and wherein an integral refrigerant passage whose cross sectional area in a direction in which the integral refrigerant passage extends is equal to or larger than that of the first refrigerant passage and that of the second refrigerant passage is formed by combining the first refrigerant passage and the second refrigerant passage in a cell stacked direction when a plurality of the first separators and a plurality of the second separators are stacked, wherein the first concave groove and the first convex rib are provided in plurality, and are positioned in parallel with each other in a direction in which the first concave groove and the first convex rib extend, and the first gas cross groove is formed in a direction perpendicular to the direction in which the first convex rib extends, and cross-links at least two of the first concave grooves; and the second concave groove and the second convex rib are provided in plurality, and are positioned in parallel with each other in a direction in which the second concave groove and the second convex rib extend, and the second gas cross groove is formed in a direction perpendicular to the direction in which the second convex rib extends, and cross-links at least two of the second concave grooves.

2. The fuel cell according to claim 1, wherein the first gas cross groove and the second gas cross groove are provided in plurality, and are alternately positioned in the direction in which the integral refrigerant passage extends, and intervals, each of which is between the first gas cross groove and the second gas cross groove that are adjacent to each other, are substantially the same.

3. The fuel cell according to claim 1, wherein the first separator is a metal separator, and the first concave groove, the first convex rib, and the first gas cross groove are formed by press molding; and the second separator is a metal separator, and the second concave groove, the second convex rib, and the second gas cross groove are formed by press molding.

4. The fuel cell according to claim 1, wherein a depth of the first gas cross groove is equal to a height of the first concave rib, and a depth of the second gas cross groove is equal to a height of the second concave rib.

5. The fuel cell according to claim 1, wherein a concave surface of the first convex rib and a concave surface of the second convex rib contact the membrane-electrode assembly, and each of a contacting area between the first convex rib and the membrane-electrode assembly and a contacting area between the second convex rib and the membrane-electrode assembly is 20% to 40% of a surface area of the membrane-electrode assembly.

6. The fuel cell according to claim 1, wherein a width of each of the first convex rib and the second convex rib is 0.5 mm to 1.5 mm, and a height of each of the first convex rib and the second convex rib is 0.3 mm to 0.6 mm.

7. The fuel cell according to claim 1, wherein each of a pitch between the first gas cross grooves and a pitch between the second gas cross grooves is 2 mm to 50 mm, and each of a length of the first gas cross groove in a direction in which the first convex rib extends and a length of the second gas cross groove in a direction in which the second convex rib extends is 0.5 mm to 3 mm.

8. The fuel cell according to claim 1, wherein a width of each of the first concave groove and the second concave groove is 0.5 mm to 3 mm.

9. The fuel cell comprising:

at least one unit cell including a first separator which is disposed on one side of a membrane-electrode assembly, and which includes a first concave groove which constitutes a first gas passage, and a first convex rib whose rear surface constitutes a first refrigerant passage, and on which a first gas cross groove is formed; and a second separator which is disposed on the other side of the membrane-electrode assembly, and which includes a second concave groove which constitutes a second gas passage, and a second convex rib whose rear surface constitutes a second refrigerant passage, and on which a second gas cross groove is formed, and wherein in an integral refrigerant passage formed by combining the first refrigerant passage and the second refrigerant passage in a cell stacked direction when a plurality of the first separators and a plurality of the second separators are stacked, a position of the first gas cross groove and a position of the second gas cross groove are deviated from each other in a direction in which the integral refrigerant passage extends, wherein the first concave groove and the first convex rib are provided in plurality, and are positioned in parallel with each other in a direction in which the first concave groove and the first convex rib extend, and the first gas cross groove is formed in a direction perpendicular to the direction in which the first convex rib extends, and cross-links at least two of the first concave grooves; and the second concave groove and the second convex rib are provided in plurality, and are positioned in parallel with each other in a direction in which the second concave groove and the second convex rib extend, and the second gas cross groove is formed in a direction perpendicular to the direction in which the second convex rib extends, and cross-links at least two of the second concave grooves.

10. The fuel cell according to claim 9, wherein the first gas cross groove and the second gas cross groove are provided in plurality, and are alternately positioned in the direction in which the integral refrigerant passage extends, and intervals, each of which is between the first gas cross groove and the second gas cross groove that are adjacent to each other, are substantially the same.

11. The fuel cell according to claim 9, wherein the first separator is a metal separator, and the first concave groove, the first convex rib, and the first gas cross groove are formed by press molding; and the second separator is a metal separator, and the second concave groove, the second convex rib, and the second gas cross groove are formed by press molding.

12. The fuel cell according to claim 9, wherein a depth of the first gas cross groove is equal to a height of the first concave rib, and a depth of the second gas cross groove is equal to a height of the second concave rib.

13. The fuel cell according to claim 9, wherein the first convex rib and the second convex rib contact the membrane-electrode assembly, and each of a contacting area between the first convex rib and the membrane-electrode assembly and a contacting area between the second convex rib and the membrane-electrode assembly is 20% to 40% of a surface area of the membrane-electrode assembly.

14. The fuel cell according to claim 9, wherein a width of each of the first convex rib and the second convex rib is 0.5 mm to 1.5 mm, and a height of each of the first convex rib and the second convex rib is 0.3 mm to 0.6 mm.

15. The fuel cell according to claim 9, wherein each of a pitch between the first gas cross grooves and a pitch between the second gas cross grooves is 2 mm to 50 mm, and each of a length of the first gas cross groove in a direction in which the first convex rib extends and a length of the second gas cross groove in a direction in which the second convex rib extends is 0.5 mm to 3 mm.

16. The fuel cell according to claim 9, wherein a width of each of the first concave groove and the second concave groove is 0.5 mm to 3 mm.

* * * * *